(12) United States Patent
Nguyen et al.

(10) Patent No.: US 9,374,024 B2
(45) Date of Patent: Jun. 21, 2016

(54) ULTRASONIC TRANSDUCER ASSEMBLY INSTALLATION DEVICE AND METHODS

(71) Applicant: Blue-White Industries, Ltd., Huntington Beach, CA (US)

(72) Inventors: John T. Nguyen, Fountain Valley, CA (US); Jason A. Woolard, Huntington Beach, CA (US); William M. McDowell, Garden Grove, CA (US); Robert E. Gledhill, III, Huntington Beach, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 454 days.

(21) Appl. No.: 14/040,451

(22) Filed: Sep. 27, 2013

(65) Prior Publication Data

US 2014/0091675 A1  Apr. 3, 2014

Related U.S. Application Data

(60) Provisional application No. 61/707,820, filed on Sep. 28, 2012.

(51) Int. Cl.
| | |
|---|---|
| *G01F 1/66* | (2006.01) |
| *H02N 11/00* | (2006.01) |
| *B06B 3/00* | (2006.01) |
| *G10K 11/00* | (2006.01) |
| *G01F 23/296* | (2006.01) |

(52) U.S. Cl.
CPC ............... *H02N 11/006* (2013.01); *B06B 3/00* (2013.01); *G01F 1/662* (2013.01); *G10K 11/004* (2013.01); *G01F 23/2968* (2013.01)

(58) Field of Classification Search
CPC ....... H02N 11/006; G01F 1/662; G01F 1/667; G01F 23/2968
USPC ................... 310/300, 309; 73/861.18–861.31
See application file for complete search history.

(56) References Cited

U.S. PATENT DOCUMENTS

| | | | |
|---|---|---|---|
| 4,019,373 A * | 4/1977 | Freeman | G01F 1/662 73/597 |
| 4,425,803 A | 1/1984 | Baumoel | |
| 4,454,767 A | 6/1984 | Shinkai et al. | |
| 4,704,907 A | 11/1987 | Mannherz et al. | |
| 4,882,934 A | 11/1989 | Leffert et al. | |
| 5,001,936 A | 3/1991 | Baumoel | |
| 5,037,546 A | 8/1991 | Janczak et al. | |
| 6,883,386 B2 | 4/2005 | Osone et al. | |
| 6,895,825 B1 | 5/2005 | Barkhoudarian | |
| 6,959,601 B2 | 11/2005 | Sinha | |
| 7,197,938 B2 | 4/2007 | Gysling et al. | |

(Continued)

*Primary Examiner* — Thomas Truong
(74) *Attorney, Agent, or Firm* — Knobbe, Martens, Olson & Bear, LLP

(57) ABSTRACT

Transducer assemblies and associated methods are provided for facilitating alignment of ultrasonic transducers with respect to pipes onto which the transducers are installed. The transducer assembly can include a transducer housing having a track on along which the transducers can be slidingly engaged. The transducer assembly can include attachment structures having alignment features used to align the transducers parallel to the axial centerline of the pipe while ensuring that the reception/emission sides of the transducers are oriented normal to the outer surface of the pipe. In some embodiments a transducer assembly alignment system can be used to align two transducer assemblies on circumferentially opposite sides of a pipe.

21 Claims, 21 Drawing Sheets

(56) References Cited

U.S. PATENT DOCUMENTS

| | | |
|---|---|---|
| 7,500,402 B2 | 3/2009 | Pors et al. |
| 7,624,651 B2 | 12/2009 | Fernald et al. |
| 7,963,176 B2 | 6/2011 | Pors et al. |
| 8,256,703 B1 | 9/2012 | Jefferson et al. |
| 2007/0232919 A1* | 10/2007 | Pors .............. A61B 8/4209 600/454 |
| 2009/0255345 A1 | 10/2009 | Gysling |
| 2010/0307263 A1 | 12/2010 | Gysling et al. |

* cited by examiner

ULTRASONIC TRANSDUCER ASSEMBLY INSTALLATION DEVICE AND METHODS

RELATED APPLICATIONS

Any and all priority claims identified in the application data sheet, or any correction thereto, are hereby incorporated by reference under 37 CFR 1.57.

BACKGROUND

1. Field of the Disclosure

The present disclosure relates generally to ultrasonic transducer assemblies and in particular to a device and methods for installing and aligning a transducer assembly for an ultrasonic transducer assembly with a pipe or other fluid conduit.

2. Description of the Related Art

Many varieties of ultrasonic transducer assemblies exist, employing a variety of techniques and mechanisms for installing the transducer assemblies on a fluid conduit. However, such devices and certain components thereof have various limitations and disadvantages.

SUMMARY OF THE DISCLOSURE

An ultrasonic flow rate measuring device can include a transducer housing having a first end and a second end. The transducer housing can have a top wall, a first side wall, and a second side wall. In some embodiments, the transducer housing includes a track in or on the top wall. The transducer assembly can include at least one attachment structure connected to one or more of the first end and the second end of the transducer housing. The at least one attachment structure can have an alignment portion configured to engage with the pipe. In some embodiments, the transducer assembly includes at least one positioning device configured to be slidable along the track. The positioning device can have a first user input device configured to secure and release the positioning device to and from a position along the track. Preferably, the transducer assembly includes at least one transducer configured to adjustably connect with the at least one positioning device. The positioning device can have a second user input device configured to operate independently from the first user input device and configured to move at least one transducer toward and away from the pipe when the transducer assembly is installed on the pipe.

According to some variants, an ultrasonic transducer assembly for measuring fluid flow through a pipe can include a transducer housing having a first end and a second end. The transducer housing can have a first side wall extending between the first end and the second end, a second side wall extending between the first end and the second end, and a top wall extending between the first end and the second end. In some embodiments, transducer housing includes a track on or in the top wall and extending over a portion of a length of the transducer housing between the first end and the second end and between the first side wall and the second side wall. The transducer housing can include a transducer opening on a side of the transducer housing configured to be adjacent to the pipe when the transducer assembly is installed on the pipe.

In some embodiments, the transducer assembly includes a first attachment structure. The first attachment structure can have a first attachment channel configured to receive a portion of a strap. The first attachment structure can be configured to connect with the first end of the transducer housing. In some cases, the transducer assembly includes a second attachment structure. The second attachment can have a channel configured to receive a portion of a strap. The second attachment structure can be configured to connect with the second end of the transducer housing.

According to some embodiments, the transducer assembly can include at least one alignment structure attached to one or more of the first attachment structure and the second attachment structure. The at least one alignment structure can have a generally flat shape and can have a width greater than a distance between the first side wall of the transducer housing and the second side wall of the transducer housing. The at least one alignment structure can have a plurality of pairs of bends, each pair of bends having one bend on one side of a centerline of the at least one alignment structure and a second bend equidistant from and on the opposite side of the centerline of the alignment structure. In some embodiments, each pair of bends can be configured to facilitate surface contact between a flat surface of the at least one alignment structure and a predetermined pipe having a diameter within a predetermined range. The centerline of the at least one alignment structure can be generally parallel to an axial centerline of a pipe when the transducer assembly is installed on the pipe.

The transducer assembly can include at least one transducer. In some embodiments, the transducer assembly includes a positioning device configured to connect to the at least one transducer. The positioning device can have a track engaging portion configured to engage the portions of the top wall adjacent the track when the positioning device is mounted onto the track. According to some variants, the positioning device can have a first adjustment input member configured to move the at least one transducer toward and away from the pipe when the transducer assembly is installed on the pipe. The positioning device can include a second adjustment input member configured to operate independently from the first adjustment input member and configured to fix the transducer to a position along the track and to release the transducer to travel along the track. The transducer assembly can include at least one strap and at least one strap tightening device. In some embodiments, the strap tightening device is configured to tighten the at least one strap around the pipe when a portion of the at least one strap is received within at least one of the first attachment channel and the second attachment channel such that the transducer assembly is secured to the pipe.

According to some variants, the track includes an entry portion sized and shaped to facilitate mounting of the positioning device onto the track. In some embodiments, one or more of the first attachment structure and the second attachment structure comprises an alignment channel configured to receive a portion of an alignment bar. The alignment channel can include a securement structure configured to secure the alignment bar within the alignment channel.

BRIEF DESCRIPTION OF THE DRAWINGS

Various embodiments are depicted in the accompanying drawings for illustrative purposes, and should in no way be interpreted as limiting the scope of the disclosure, in which like reference characters denote corresponding features consistently throughout similar embodiments.

DETAILED DESCRIPTION

Figure 1:
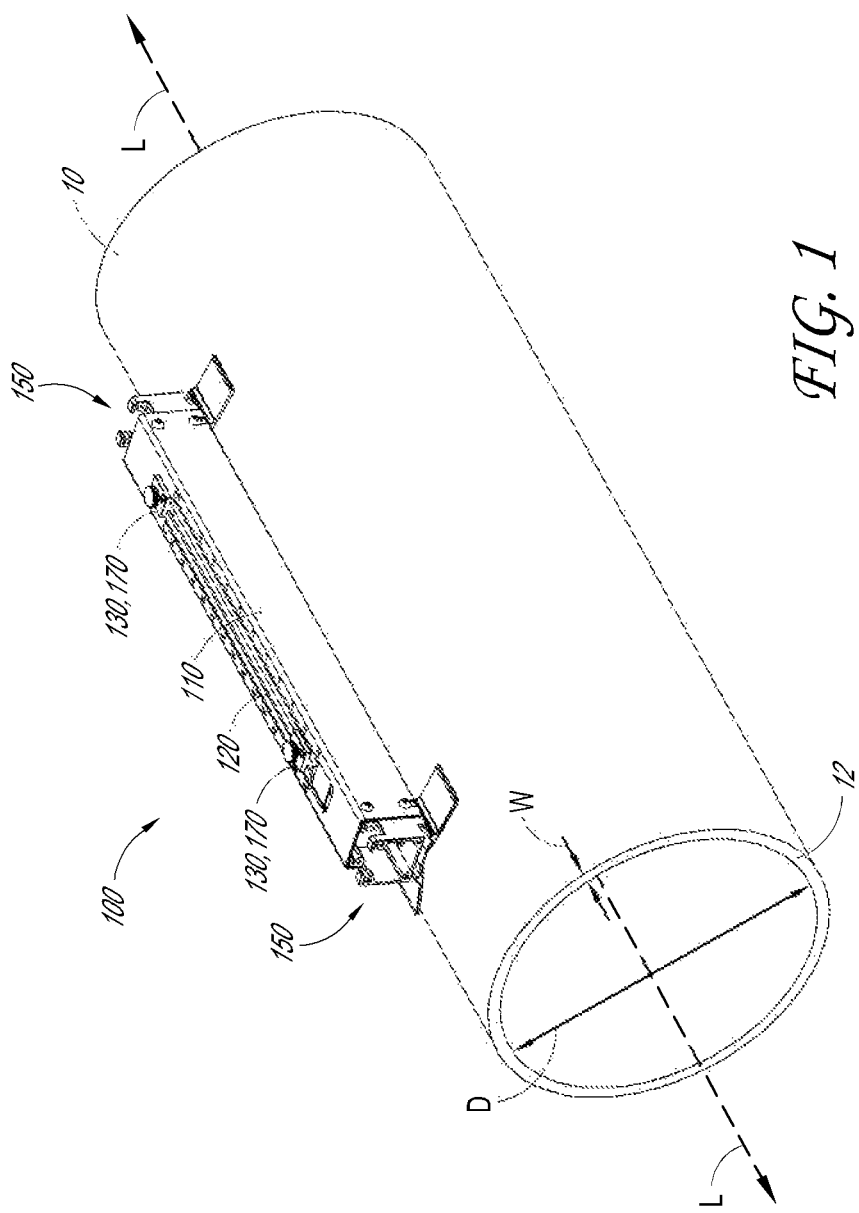
FIG. 1 is a perspective view of an embodiment of a transducer assembly installation device installed on a pipe.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein.

Ultrasonic transducer assemblies are used to measure flow characteristics of fluid flowing through pipes or other fluid lines. The transducer assemblies can include two or more transducers configured to send and receive ultrasonic signals through the fluid line and corresponding fluid. Transducer assemblies can indicate such parameters as the velocity of the fluid through the fluid line. Transducer assemblies can be used in conjunction with pumps and other devices to monitor and/or control flow rates through fluid lines.

The transducers used in the transducer assemblies often must be precisely aligned with the longitudinal axis of the fluid line on which they are installed. Misalignment of the transducers can increase the likelihood that the ultrasonic signals sent from the first transducer will not be received by the second transducer. To alleviate the risk of misalignment, manual procedures such as marking the pipe can be used to line up the transducers with one another and with the pipe. The two or more transducers can be attached independently to the pipe, such that bumping or otherwise moving one of the transducers can result in misalignment. It is advantageous to mechanically link the two or more transducers such that moving one transducer can result in similar or equivalent movement of the other transducers within the transducer assembly.

FIGS. 1-4 illustrate an embodiment of an ultrasonic transducer assembly transducer assembly 100 installed on a pipe 10. The transducer assembly 100 is configured to be installed on pipes 10 having a variety of diameters D. The transducer assembly 100 can be calibrated to measure flow characteristics of fluids traveling through pipes 10 having varying diameters D and having walls 12 with varying thicknesses W. The transducer assembly 100 can generally include a transducer housing 110. One or more transducers 170 can be mounted on the transducer housing 110. The transducers 170 can be connected to positioning devices 130 configured to slidably engage with a track 120 on the transducer housing 110.

The transducer assembly 100 can include one or more attachment structures 150 attached to one or both ends of the transducer housing 110. The attachment structures 150 can, as will be discussed in detail below, be configured to receive straps, tape, cords, zip-ties, and/or other similar tightening devices (not shown) within a groove in the attachment structure 150. The tightening devices can be wrapped around, adhered to, or otherwise secured to the pipe 10. Securing the tightening devices to the pipe 10 when the tightening devices are received by the one or more attachment structures 150 can secure the transducer assembly 100 to the pipe 10.

Figure 1A:
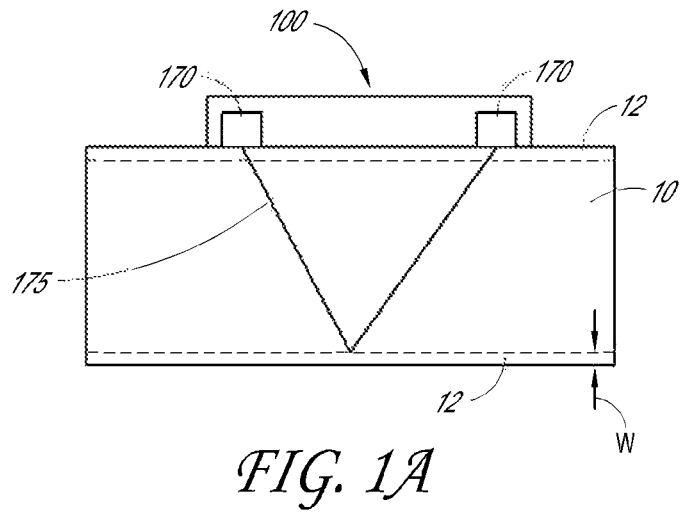
FIG. 1A is a schematic view of a transducer assembly installation device installed on a pipe and implementing a V-beam measuring strategy.
Figure 1B:
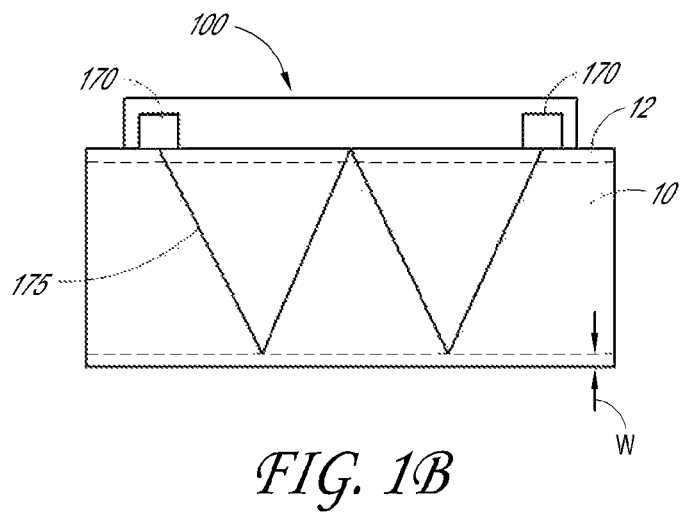
FIG. 1B is a schematic view of a transducer assembly installation device installed on a pipe and implementing a W-beam measuring strategy.
Figure 1C:
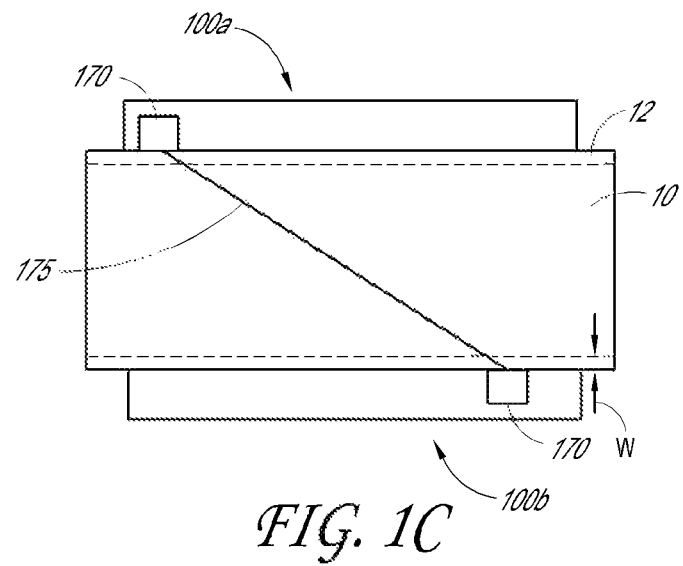
FIG. 1C is a schematic view of two transducer assembly installation devices installed on a pipe and implementing a Z-beam measuring strategy.

As illustrated in FIGS. 1A-1C, a number of techniques can be used to measure flow characteristics of fluid flowing through a pipe 10 or other fluid conduit. In some embodiments, as illustrated in FIG. 1A, a V-beam measuring technique is used. In some such embodiments, a signal 175 is emitted from one transducer 170, passed through the wall 12 of the pipe 10 and through the fluid within the pipe 10, reflected off of the wall 12 of the pipe 10, and received by the other transducer 170 installed on the same side of the pipe 10. As illustrated in FIG. 1B, a W-beam measuring technique can be used with some pipes 10 and with some transducer assemblies 100. In such an embodiment, a signal 175 emitted from one of the transducers 170 can pass through the near wall 12 and through the fluid, reflect off the far wall 12, reflect off the near wall 12, and reflect off the far wall 12 again, before being received by the non-emitting transducer 170.

In some embodiments, as illustrated in FIG. 1C, two or more transducer assemblies 100 can be used to measure flow characteristics of a fluid within a pipe 10. In some such embodiments, a Z-beam measuring technique is implemented wherein a transducer 170 on an upper transducer assembly 100a emits a signal 175 through the wall 12 nearest the upper transducer assembly 100a, through the fluid within the pipe 10, and through the wall 12 nearest the lower transducer assembly 100b to be received by the transducer 170 in the lower transducer assembly 100b. Z-beam measuring techniques can be beneficial when the characteristics of the pipe 10 (e.g., diameter D, wall thickness W, material) and/or the characteristics of the fluid within the pipe 10 render the V-beam measuring technique and/or the W-beam measuring technique unfeasible. Some such scenarios can include, for example, measurement sites with large-diameter (e.g., greater than 40 inches) pipes 10. Many variations of the V-beam, W-beam, and Z-beam measuring techniques can also be implemented. For example, triple-V-beam, N-beam (e.g., where the signal 175 is reflected off of the wall twice before being received by a transducer 170 located on the side of the pipe 10 opposite the emitting transducer 170), and other measuring techniques can be used.

Alignment of the two or more transducers 170 along substantially the same circumferential point of the pipe 10 (e.g., when using the V-beam or W-beam techniques) or along circumferentially-opposite points of the pipe 10 (e.g., when using the Z-beam technique wherein the transducers 170 are on opposite sides of the pipe 10 from each other) can increase the likelihood that the signal 175 emitted by one of the transducers 170 is received by the other transducer 170. Precise alignment of the transducers 170 in such a manner can increase the accuracy of the measurements taken by the transducer assembly 100 and can reduce the likelihood that transducer assembly 100 outputs incorrect flow characteristic values.

Figure 2:
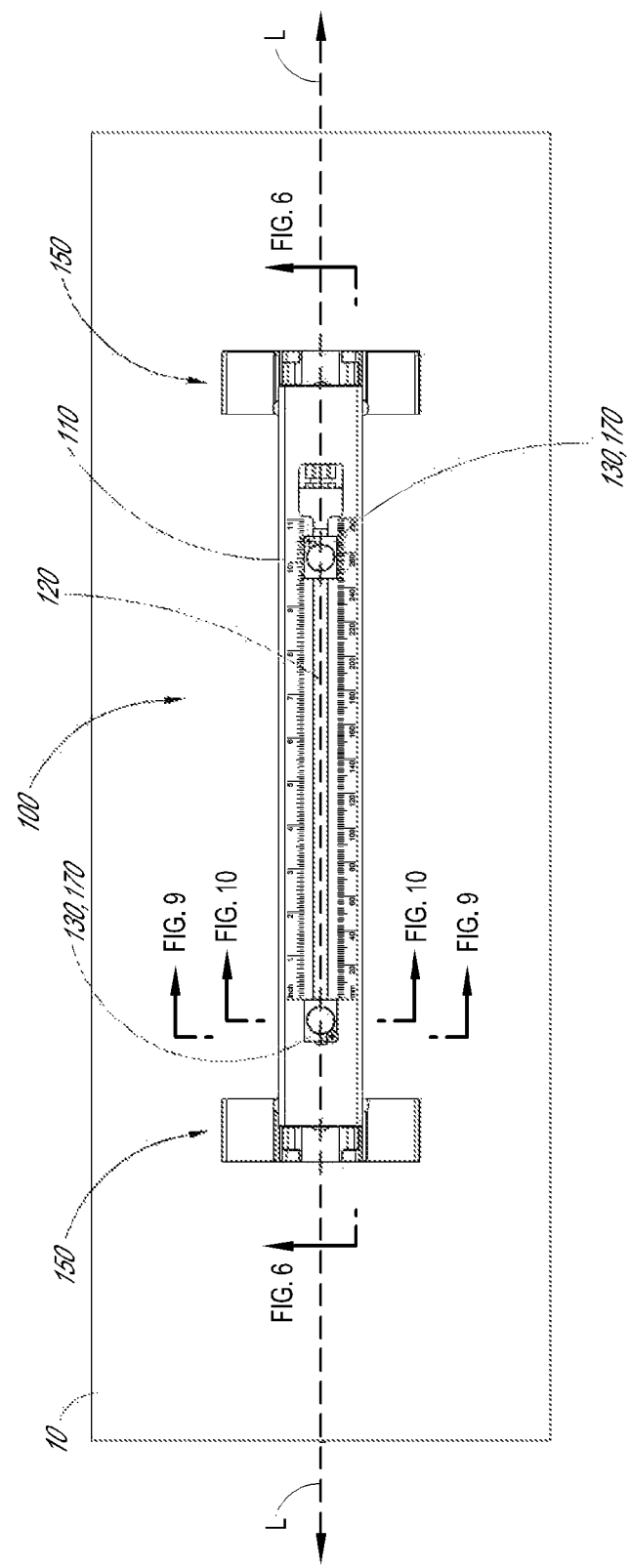
FIG. 2 is a top view of the transducer assembly installation device of FIG. 1 installed on a pipe.
Figure 3:
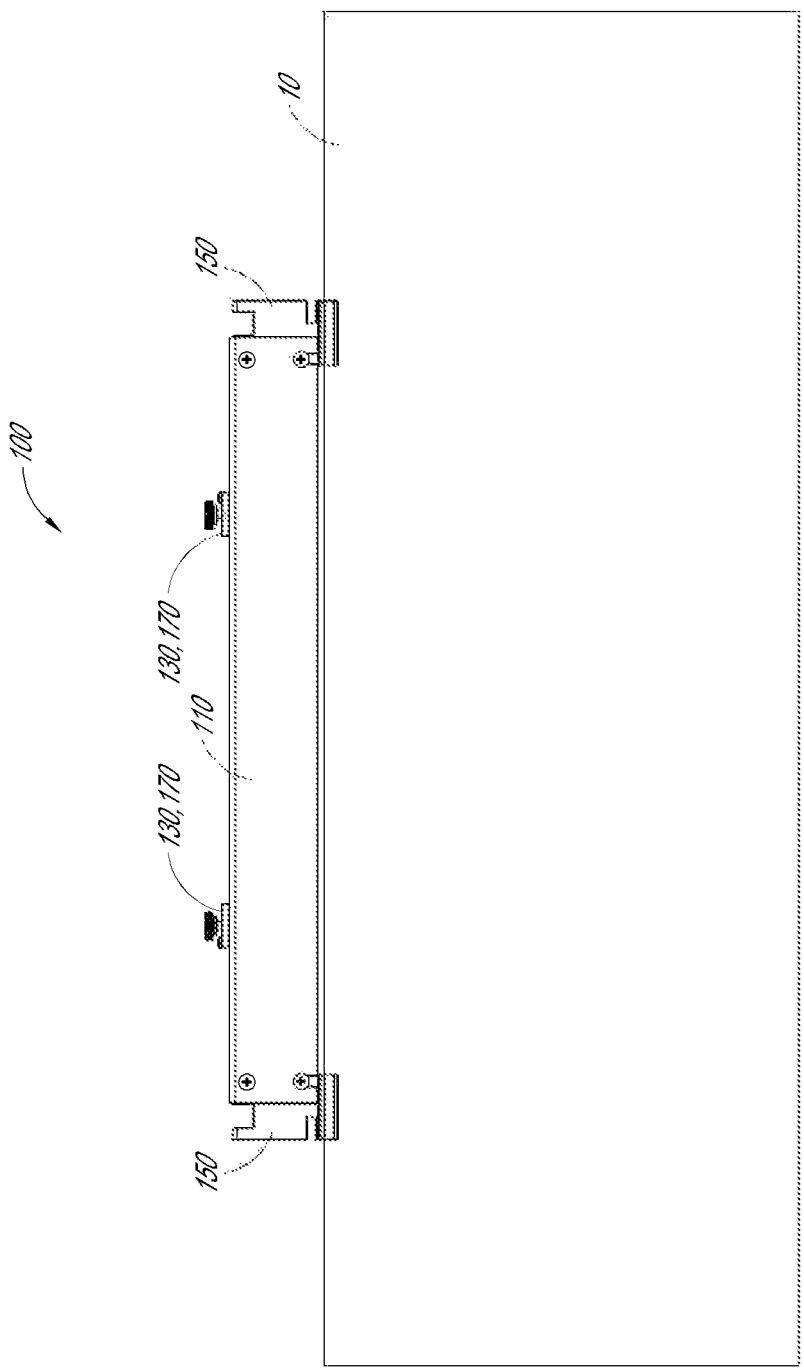
FIG. 3 is a side view of the transducer assembly installation device of FIG. 1 installed on a pipe.
Figure 4:
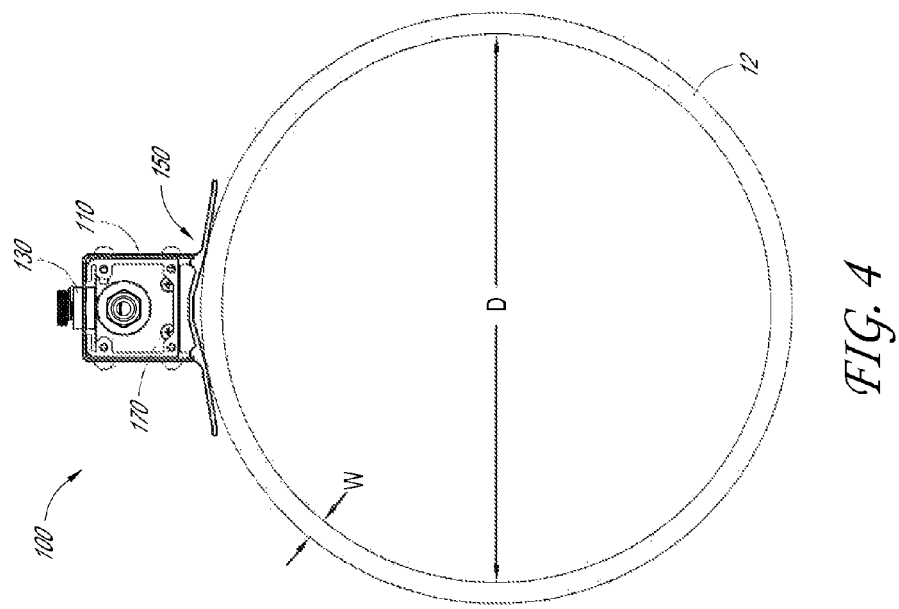
FIG. 4 is a front view of the transducer assembly installation device of FIG. 1 installed on a pipe.
Figure 10:
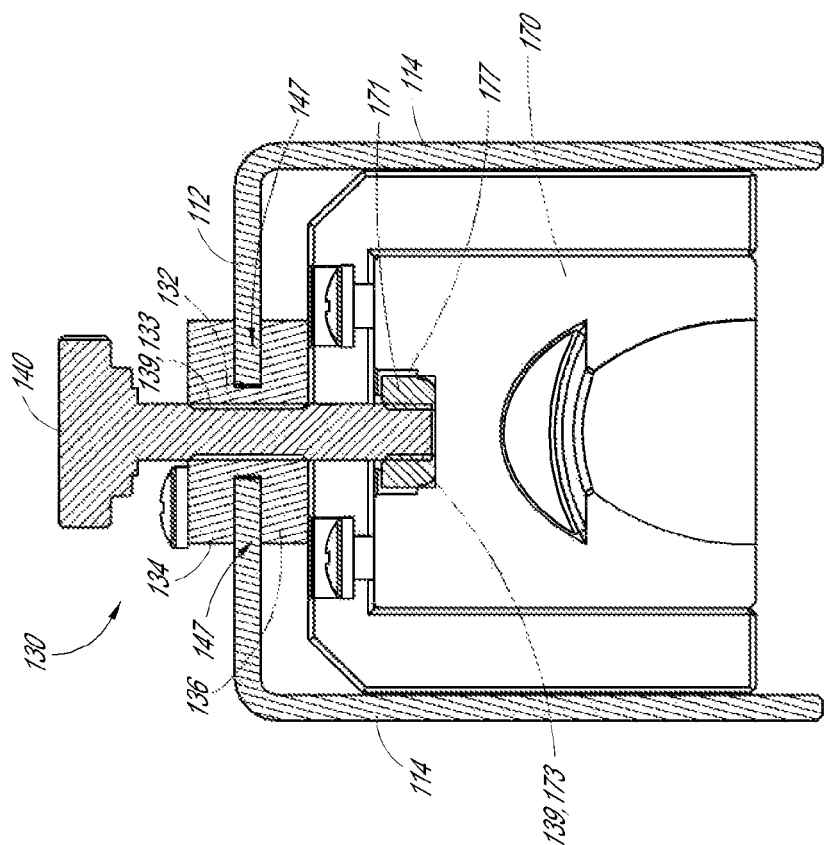
FIG. 10 is a front view of the transducer assembly installation device of FIG. 1 along the cut plane 10-10 of FIG. 2.

As illustrated in FIG. 2 and discussed in detail below, the alignment structures 150 attached to one or more of the ends of the transducer housing 110 can facilitate alignment of the transducers 170 along an axial centerline L of the pipe 10. Specifically, the alignment structures 150 can facilitate alignment of the track 120 along the axial centerline L. As illustrated in FIGS. 4 and 10, the alignment structures 150 can help to ensure that the transducers 170 are aligned such that the reception/emission side (e.g., the bottom surface) of each transducer 170 is normal to the outer surface of the wall 12 of the pipe 10 when the transducer assembly 100 is installed on the pipe 10. In some such arrangements, alignment of the transducers 170 increases the likelihood that the signal 175 emitted from the transducers passes through or near the axial centerline L of the pipe 10.

Figure 5:
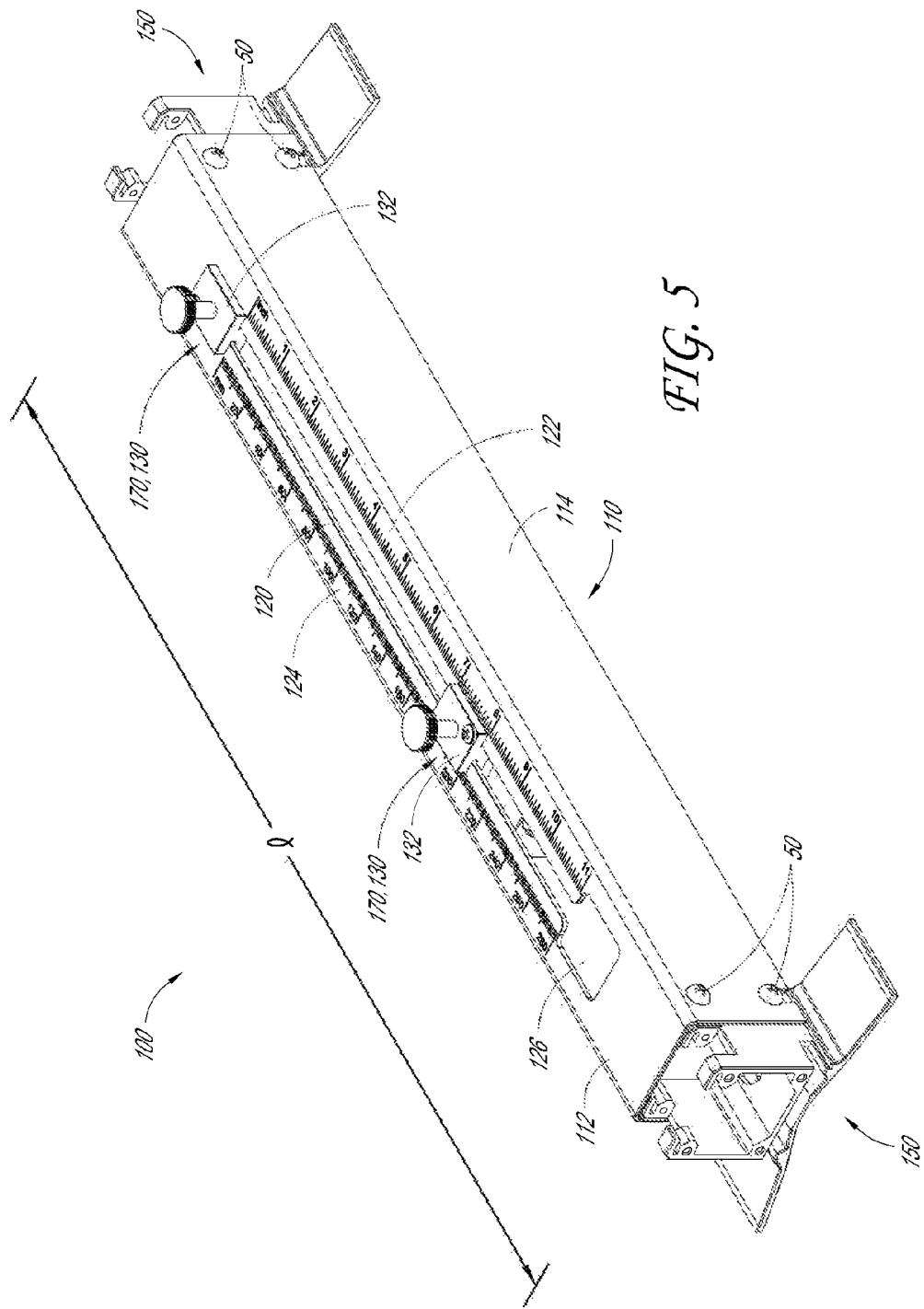
FIG. 5 is a perspective view of the transducer assembly installation device of FIG. 1.
Figure 6:
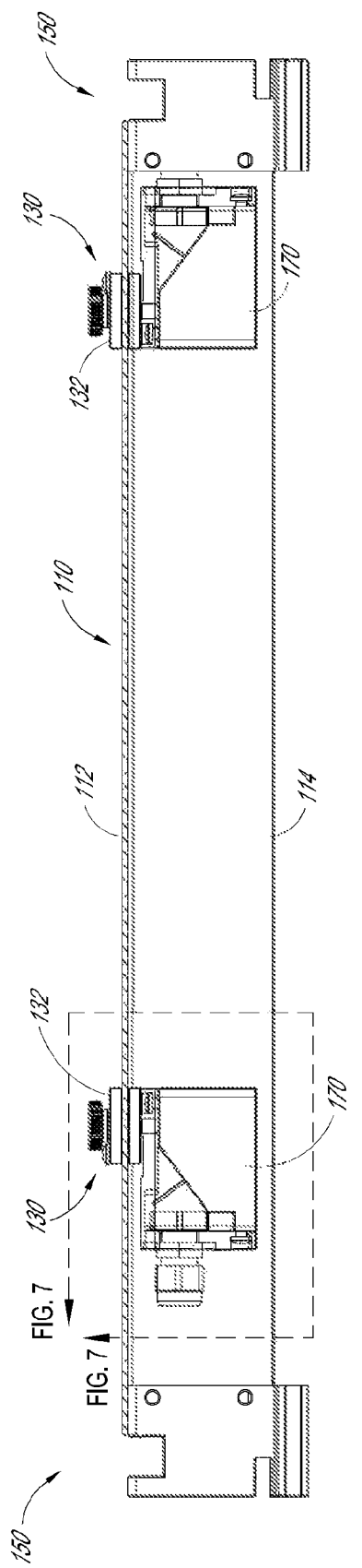
FIG. 6 is a side cutaway view of the transducer assembly installation device of FIG. 1.
Figure 7:
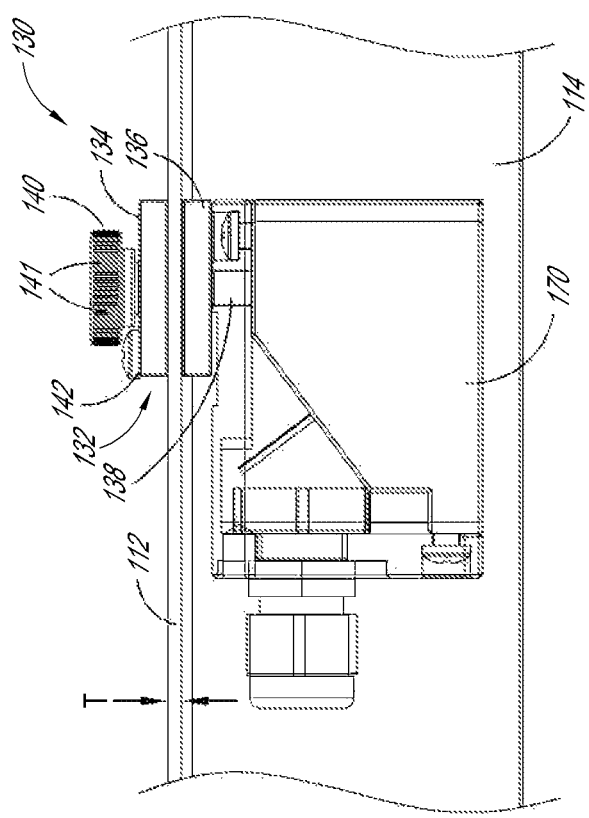
FIG. 7 is a side cutaway view of the transducer assembly installation device of FIG. 1 within the frame 7-7 of FIG. 6.

FIG. 5 illustrates an embodiment of the transducer assembly 100 having a transducer housing 110 with a length l. The transducer housing 110 can have a top wall 112 extending along the length l of the housing 110. Two side walls 114 can border and extend below the top wall 112. In some embodiments, the two side walls 114 and the top wall 112 all extend the length l of the transducer housing 110. In some embodiments, the one or more of the two side wall 114 and the top wall 112 extend less than the entire length l of the transducer housing 110. According to some variants, the transducer housing 110 includes a bottom wall substantially parallel to the top wall 112 and bordered by the side walls 114. As illustrated in FIGS. 5-10, the transducer housing 110 can be constructed without a bottom wall. Such a configuration can be advantageous in that it can reduce material costs, can simplify assembly and/or disassembly of the transducer assembly 100 (e.g., insertion of the transducers 170 and/or positioning devices 130 into the transducer housing 110 can be accomplished with fewer structural impediments), and/or can reduce the difficulty of bringing the transducers 170 into contact with a pipe 10 onto which the transducer assembly 100 is installed. The ends of the transducer housing 110 can be left open or can be covered with end caps. In some embodiments, in order facilitate connection of electrical conduits (e.g., wires, cables) to the transducers 170 when the transducers 170 are installed in the transducer housing 110, the ends of the transducer housing 110 are left open.

The top wall 112 of the transducer housing 110 can include a track 120. The track 120 can extend along a portion of or the entire length l of the transducer housing 110. In some embodiments, the track 120 includes an entry portion 126. The entry portion 126 can be wider than the remainder of the track 120 and can be configured to facilitate mounting of the positioning devices 130 onto the track 120. For example, the shape of the entry portion 126 can be such that a top view cross-section of the positioning device 130 (e.g., the area occupied by the positioning device 130 in FIG. 2) can be smaller than and can fit into the entry portion 126. The top wall 112 can include one or more length indicators 122, 124 adjacent the track 120. For example, the top wall can include an English length indicator 122 on one side of the track 120 and a metric length indicator 124 on another side of the track 120. Any other system of length measurement could be included on the top wall 112 of the transducer housing 110.

Figure 8:
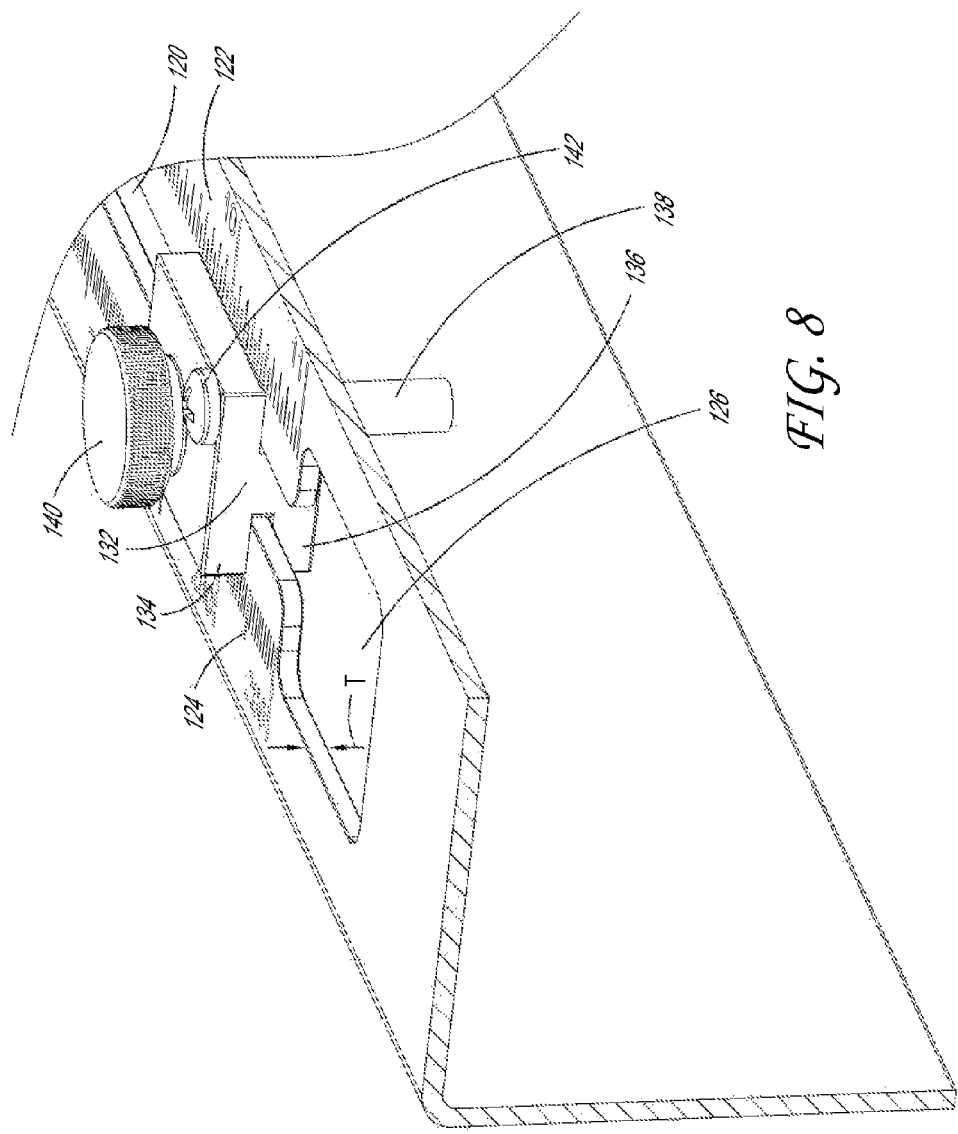
FIG. 8 is a zoomed-in perspective view of the transducer assembly installation device of FIG. 1 without a transducer.
Figure 9:
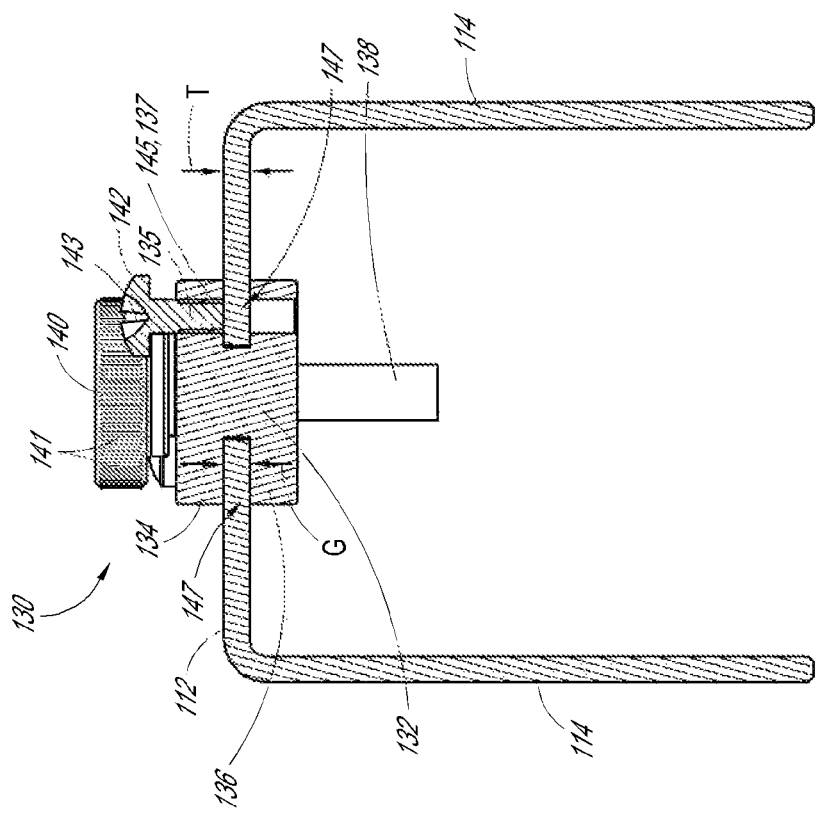
FIG. 9 is a front view of the transducer assembly installation device of FIG. 1 along the cut plane 9-9 of FIG. 2.

In some embodiments, as illustrated in FIG. 8, the track 120 can comprises a cut-out portion of the top wall 112. The track 120 can include one or more flanges extending parallel to the plane of the top wall 112 or otherwise. The entry portion 126 of the track 120 can be a cut-out of a portion of the top wall 112. In some embodiments, the track 120 extends through an end of the top wall 112. In some such embodiments, the positioning devices 130 can be mounted directly to the track 120 from the end of the transducer housing 110.

As illustrated in FIG. 6-9, the positioning device 130 can include a positioning body 132. In some embodiments, the positioning body 132 and/or positioning device 130 includes one or more track-engaging portions 134, 136. For example, the positioning body 132 can include one or more pairs of flanges 134, 136 defining one or more channels 147 therebetween. The channels 147 between the flanges 134, 136 can be sized and configured to receive portions of the top wall 112 adjacent the track 120. In some such configurations, the channels 147 can be sized so that the portions of the top wall 112 adjacent the track fit snugly within the channels 147 (e.g., the height of the channels 147 can be sized to greater than but close to the thickness T of the top wall 112). In some such embodiments, the positioning device 130 can be permitted to slide along the track 120 while the engagement between the channels 147 and the portions of the top wall 112 adjacent the tack 120 inhibit rotation and/or tilting of the positioning device 130 relative to the top wall 112.

The positioning devices 130 can include a track-clamping device 142. The track clamping device 142 can comprise, for example, a threaded bolt. In some embodiments, the track-clamping device 142 includes a user input portion 143. The user input portion 143 of the track-clamping device 142 can be, for example, a Phillips screw drive, a flathead screw drive, a knob, or any other appropriate user input configuration. The track-clamping device 142 can include a threaded portion 145 configured to engage with a threaded aperture 137 in the positioning body 132. As the track-clamping device 142 is rotated relative to the threaded aperture 137, the engagement between the threaded portion 145 and the threaded aperture 137 can cause the track-clamping device 142 to move up and down (e.g., up and down with respect to the orientation of FIG. 9) with respect to the positioning body. Downward movement of the track-clamping device 142 can bring the device 142 into contact with a portion of the top wall 112 adjacent the track 120. Further downward movement of the track-clamping device 142 toward the top wall 112 can clamp the positioning device 130 onto the top wall 112 (e.g., the top wall 112 can be fixed between the track-clamping device 142 and the lower flange 136 of the positioning body 132). Such clamping can inhibit movement of the positioning device 130 with respect to the transducer housing 110 and can fix the positioning device 130 at a particular point along the track 120. Releasing the clamping can allow the positioning device 130 to move along the track 120.

As illustrated in FIG. 10, a transducer 170 can be connected to a positioning device 130 via a transducer-engaging device 140. The transducer-engaging device 140 can be configured to move the transducer 170 toward and away from the pipe 10 (e.g., in the radial direction) when the transducer assembly 100 is installed onto the pipe 10. This radial movement of the transducer 170 can be accomplished independently from the clamping and releasing function of the track-clamping device 142.

The transducer-engaging device 140 can comprise a threaded bolt. In some embodiments, the transducer-engaging device 140 includes a user interface such as a Phillips screw drive, a flathead screw drive, a knob, or any other appropriate user input configuration. For example, the transducer-engaging device 140 can include a knob having a textured portion 141 configured to facilitate grip between the fingers of a user and the knob. The transducer-engaging device 140 can include a threaded extension 138. The threaded extension 138 can include threads 139 configured to engage with a second threaded aperture 133 in the positioning body 132. Rotation of the transducer-engaging device 140 with respect to the positioning body 132 can cause the transducer-engaging device 140 to move up and down with respect to the positioning body 132.

In some embodiments, the threaded extension 138 can engage with a nut 171 located within a cavity 177 in the transducer 170. The nut 171 can engage with the threaded extension 138 via threaded engagement between the threads 139 and threads 173 on the interior of the nut 171. In some embodiments, the nut 171 can be fixed to the threaded extension 138 via welding, adhesion, or some other appropriate mode of connection. The cavity 177 can be sized and shaped to allow the nut 171 to rotate freely within the cavity 177. In some such embodiments, rotation and subsequent translational movement of the transducer-engaging device 140 can cause the transducer 170 to translate up and down with the transducer-engaging device 140. For example, when there is clearance between the bottom of the transducer 170 and the pipe 10, the transducer 170 can "hang" from the nut 171. In such an embodiments, the vertical position (e.g., location toward and away from the pipe 10 when the transducer assembly 100 is installed on the pipe 10) of the transducer 170 can be controlled by vertical movement of the nut 171. Upon contact between the transducer 170 and the pipe 10, further downward movement of the nut 171 can bring the bottom of the nut 171 into contact with the transducer 170.

Figure 11:
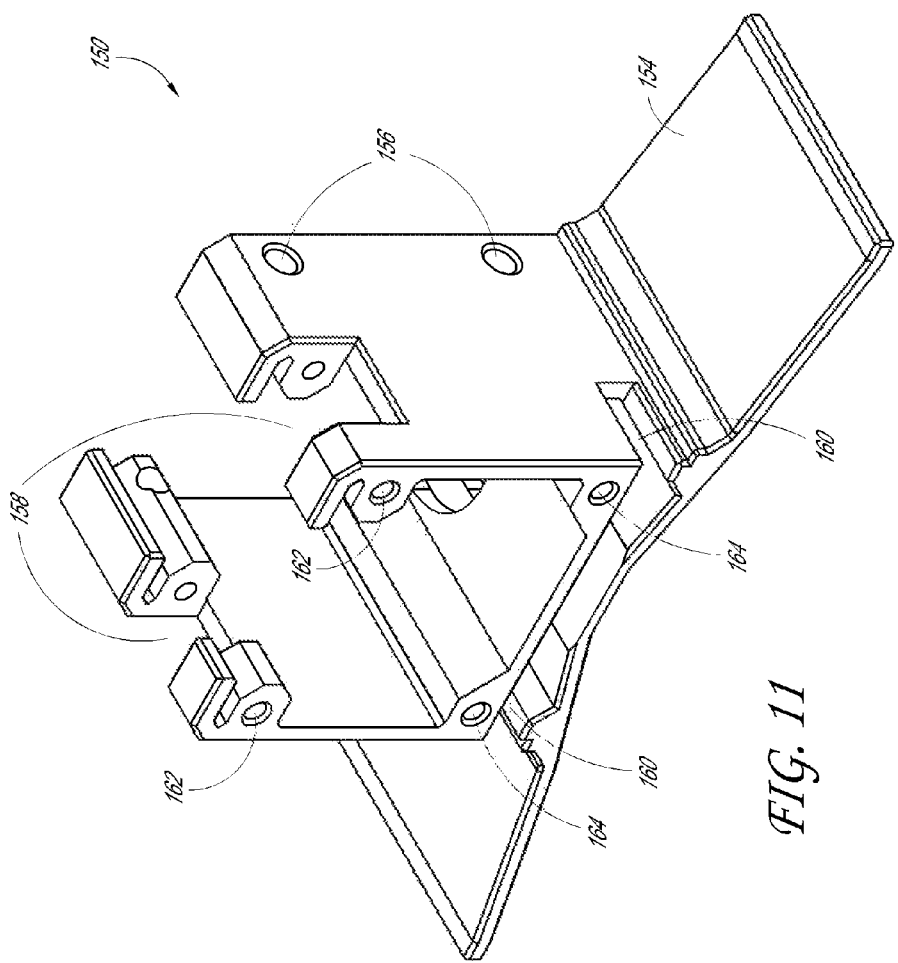
FIG. 11 is a perspective view of an attachment structure of the transducer assembly installation device of FIG. 1.
Figure 12:
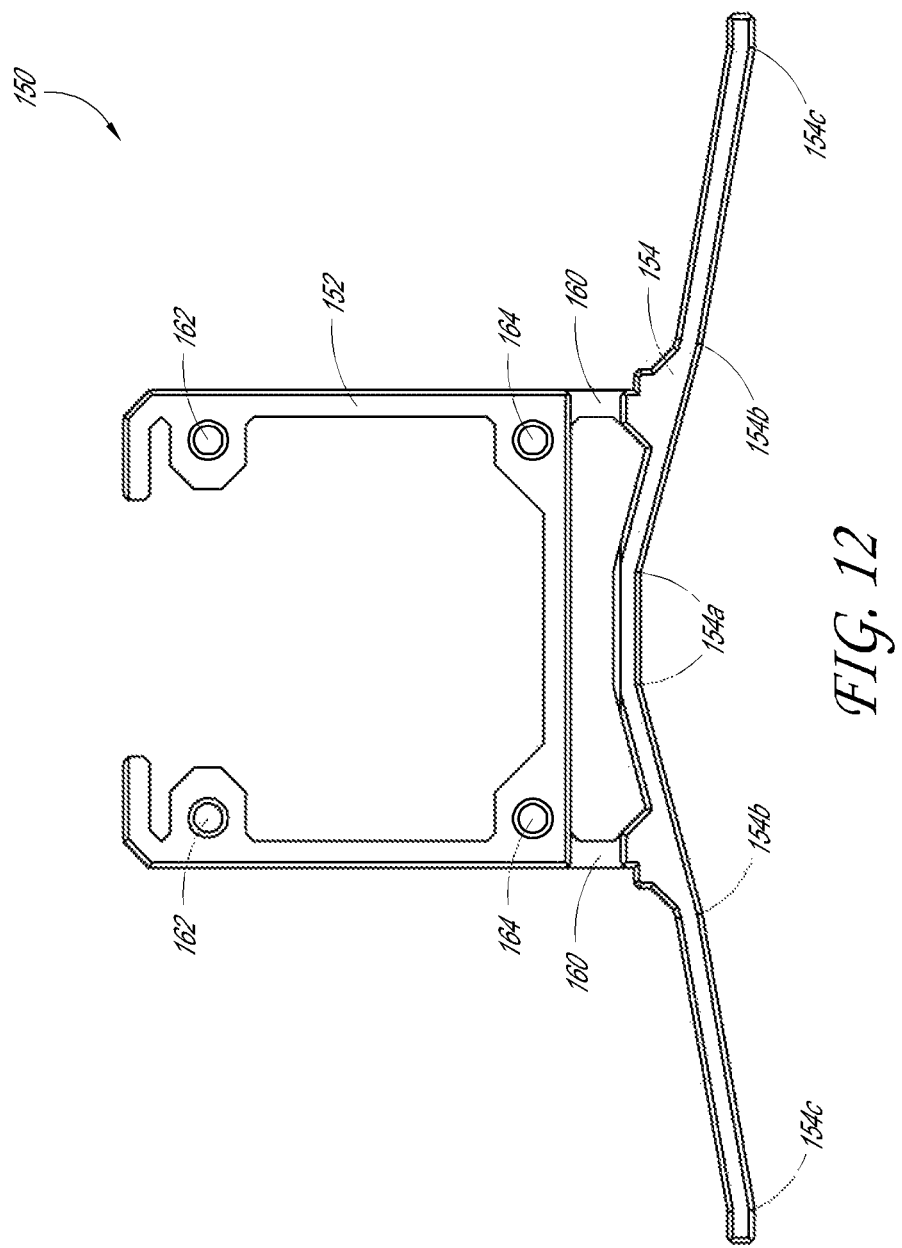
FIG. 12 is a front view of an attachment structure of the transducer assembly installation device of FIG. 1.
Figure 13:
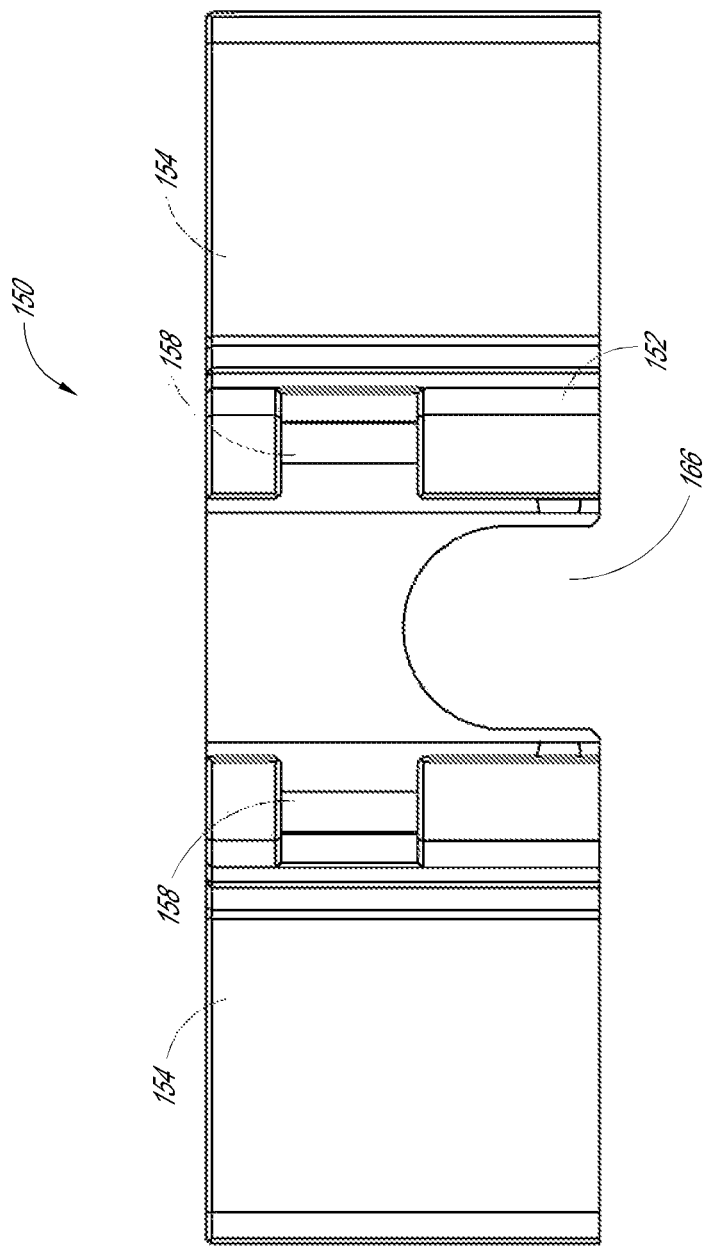
FIG. 13 is a top view of an attachment structure of the transducer assembly installation device of FIG. 1.

As illustrated in FIGS. 11-13, the attachment structures 150 attached to one or more ends of the assembled transducer assembly 100 can include an a body portion 152 connected with an alignment portion 154. The body portion 152 can be configured to connect with the transducer housing 110 via one or more housing-connection features 156. For example, the housing-connection features 156 can be a plurality of threaded holes configured to align with corresponding holes and/or channels in the transducer housing 110. In some embodiments, the attachment structure 150 is attached to an end of the transducer housing 110 by inserting fasteners 50 into the housing-connection features 156 and through the corresponding apertures and/or channels in the transducer housing 110. In some embodiments, the attachment structure 150 is configured to facilitate connection of a second transducer housing 110 in series with the first transducer housing 110. For example, the attachment structure 150 can include a second set of housing connection features 156 configured to facilitate connection between the attachment structure 150 and a second transducer housing 110. Subsequent transducer housings 110 could be added in series using additional attachment structures 150 in series.

The body portion 152 of the attachment structure 150 can include a plurality of securement features 162 configured to facilitate securement of an alignment bar to the structure 150 within an alignment channel 158 of the body portion 152, as will be discussed further below. In some embodiments, the body portion 152 includes a strap channel 160 configured to receive a portion of a strap, zip-tie, cord, rope, or other tightening device. In some such embodiments, the tightening device (not shown) can be passed through the channel 160 and around the pipe 10 onto which the transducer assembly 100 is to be installed. The tightening device can then be tightened to secure the transducer assembly 100 to the pipe 10.

As illustrated in FIG. 12, the alignment portion 154 can comprise a pair of flanges extending away from the body portion 152 and away from each other. The alignment portion 154 can be sized and shaped to facilitate surface contact between the alignment portion 154 and pipes 10 with standard diameters. For example, the alignment portion 154 can include a plurality of pairs of bends 154a, 154b, 154c each configured to facilitate surface contact between the alignment portion 154 and a particular-sized pipe 10. The first pair of bends 154a can be positioned and oriented to maximize surface contact between a pipe 10 with a standard diameter D and the portions of the flanges between the first pair of bend 154a and the second pair of bends 154b. In some embodiments, the second pair of bends 154b are configured to maximize surface contact between a pipe 10 with a larger standard diameter D and the portions of the flanges between the second pair of bend 154b and the third pair of bends 154c. The third pair of bends 154c can be arranged to maximize surface contact between a pipe 10 with a still larger standard diameter D and the portions of the flanges extending beyond the third pair of bends 154c. Increasing surface contact between the alignment portion 154 and the pipe 10 onto which the transducer assembly 100 is installed can increase the frictional force between the alignment portion 154 and the pipe 10. Increasing the frictional force between the alignment portion 154 and the pipe 10 can reduce the likelihood that the alignment portion 154 will change position with respect to the pipe 10 when the transducer assembly 100 is installed on the pipe 10 (e.g., when the tightening device is passed through the channel 60 and tightened around the pipe 10.

In some embodiments, the attachment structure 150 is constructed to be symmetric about a plane separating the two flanges of the alignment portion 154 and extending perpendicular to the planes defined by each of the pairs of bends 154a, 154b, 154c. In some embodiments, symmetry of the attachment structures 150 can facilitate interchangeability of the attachment structures 150 between separate ends of separate transducer housings 110.

Figure 14:
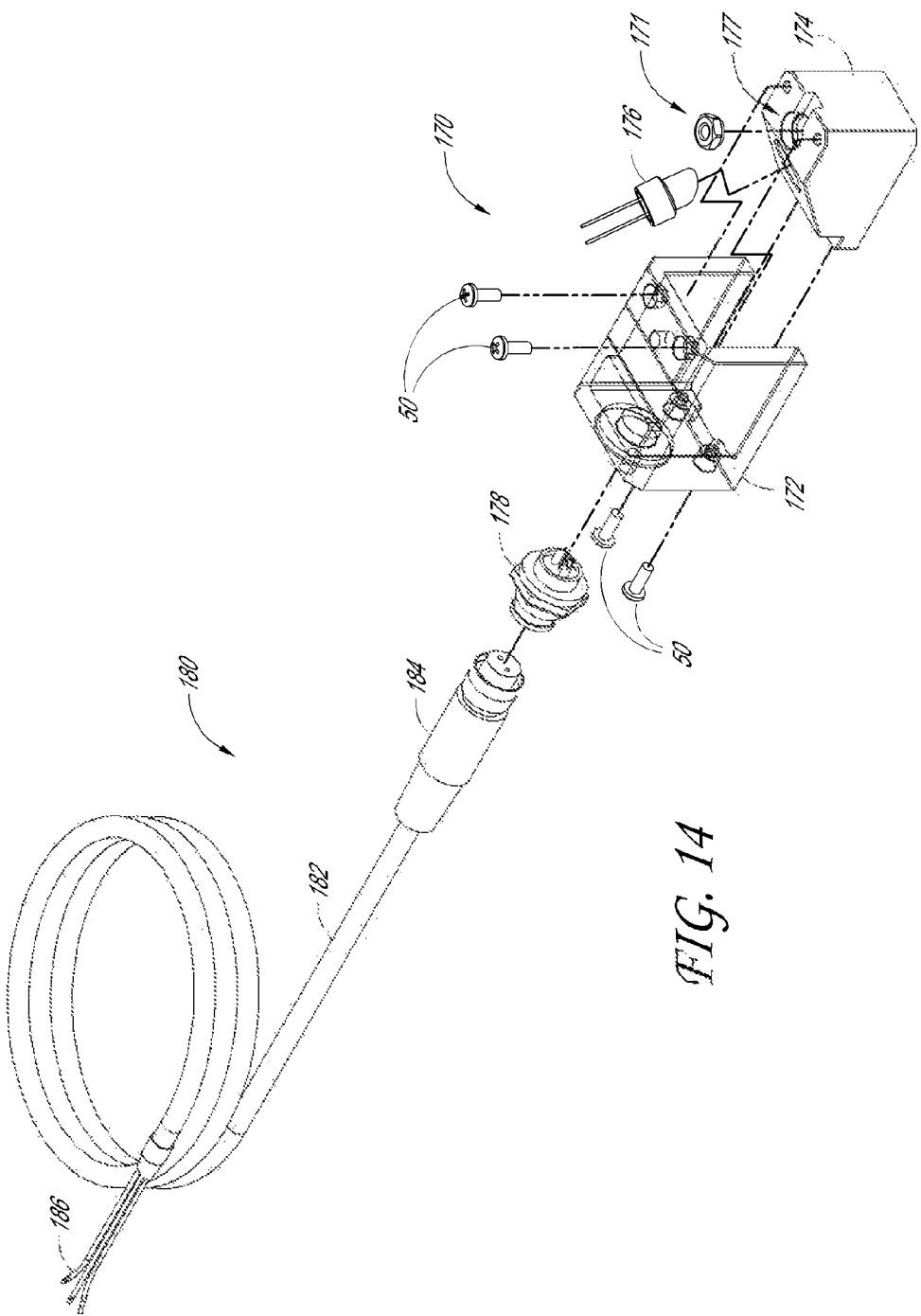
FIG. 14 is an exploded assembly view of a transducer.

As illustrated in FIG. 14, the transducers 170 can include a transducer housing 174 and a transducer cover 172. The transducer housing 174 can be configured to house a wave guide 176 configured to emit and/or receive ultrasonic signals 175. The transducer cover 172 can be configured to attach to the transducer housing 174 via a plurality of fasteners 50. Attachment between the transducer cover 172 and the transducer housing 174 can create the cavity 177 configured to retain the nut 171 and a portion of the threaded extension 138 of the transducer-engaging device 140. The transducer can include a cable connector 178 configured to electrically and mechanically connect with a coupler 184 of a cable assembly 180. Connection between the cable connector 178 and the coupler 184 of the cable assembly 180 can facilitate electrical communication between the cable assembly and the transducer 170. The cable assembly 180 can include a cable 182 comprising a plurality of input/output conduits 186. The conduits 186 can be configured to connect with a controller (not shown) to configured to control the transducers 170 and configured to record the output from the transducers 170.

A method of measuring flow characteristics of fluid flowing through a pipe 10 can include installing one or more transducers 170 onto a transducer housing 110. Installing of the transducers 170 can include attaching the transducers 170 to positioning devices 130 via engagement between a transducer-engaging device 140 and a nut 171 within the cavity 177 in the transducer 170. The positioning devices 130 can be mounted onto the track 120 of a transducer housing 110 via an entry portion 126 of the track 120. For example, to implement a V-beam or W-beam measuring strategy, two transducers 170 can be installed onto a transducer housing 110 as described above. The assembled transducer assembly 100 can be attached to the outside surface of the pipe 10 by placing the transducer assembly 100 onto the pipe 10 in an orientation generally parallel to the axial centerline L of the pipe 10. A tightening device can be passed through channels 160 in the attachment structures 150 of the transducer assembly 100 and tightened around the pipe 10 to secure the transducer assembly 100 to the pipe 10. The alignment portions 154 of the attachment structures 150 can ensure correct (e.g., parallel to the axial centerline L of the pipe 10) alignment of the transducer assembly 100 and transducers 170 with the pipe 10.

Upon or before installation and alignment of the transducer assembly 100 onto the pipe 10, characteristics (e.g., diameter D, wall thickness W, material composition) of the pipe 10 and the fluid passing through the pipe can used to calculate (e.g., via a pre-determine algorithm and/or software program) an appropriate distance between the two transducers 170. Upon calculation of the appropriate distance between the two transducers 170, a first one of the transducers 170 can be fixed in position along the track 120 by clamping positioning device 130 onto the top wall 112 of the transducer housing 110, as explained above. The fixed transducer 170 can then be moved into contact with the wall 12 of the pipe 10 via rotation or other manipulation of the transducer-engaging device 140. The second transducer 170 can then be moved along the track 120 until positioned at the pre-determined appropriate distance from the fixed transducer 170. Confirmation of the distance between the two transducers 170 can be achieved with reference to the length indicators 122, 124. The second transducer 170 can be fixed in position in a manner similar to or the same that described for the first transducer 170. Either of the transducers 170 can be moved from its initial position after installation of the transducer assembly 100 upon the pipe 10. For example, upon reception of faulty data, the position of one or both of the transducers 170 along the track 120 can be modified until a clear and accurate signal is obtained.

In some implementations, it can be advantageous to use a Z-beam measuring configuration to measure the flow characteristics of a fluid flowing through a pipe 10. In some such implementations, multiple transducer assemblies 100 can be installed onto a pipe 10 using a transducer assembly aligning system. For example, as illustrated in FIGS. 15-19, a transducer alignment assembly 200 can be used to install a first transducer assembly 100a and a second transducer assembly 100b onto a pipe 10. The first and second transducer assemblies 100a, 100b can be similar or substantially the same as the transducer assembly 100 described above.

As described above, the attachment structures 150 can each include an alignment channel 158 configured to receive an alignment rod 210. As illustrated in FIG. 18, an alignment rod 210 can be connected with an attachment structure 150 by engaging a notch 214 or other engagement structure on the alignment rod 210 with the alignment channel 158 of the attachment structure 150. In some embodiments, the attachment structure 150 can include one or more securement features 162 such as threaded apertures through which fasteners can be inserted to clamp the alignment rod 210 within the alignment channel 158. The engagement between the notches 214 and the alignment channels 158 can help ensure that the angles 206 formed between the alignment rods 210 and the transducer housings 110 when viewed from above (e.g., the perspective shown in FIG. 17) are substantially 90°.

Upon installation of alignment rods 210 into the alignment channels 158 of the transducer assemblies 100a, 100b, an orientation rod 220 can be inserted through an aperture 212 of one of the alignment rods 210a installed on the transducer assembly 100a. The orientation rod 220 can be sized to fit snugly within the apertures 212 of the alignment rods 210 and can include an increased diameter portion (e.g., a flange or radial protrusion) configured to inhibit the orientation rod 220 from passing entirely through (e.g., falling through) the apertures 212.

Figure 16:
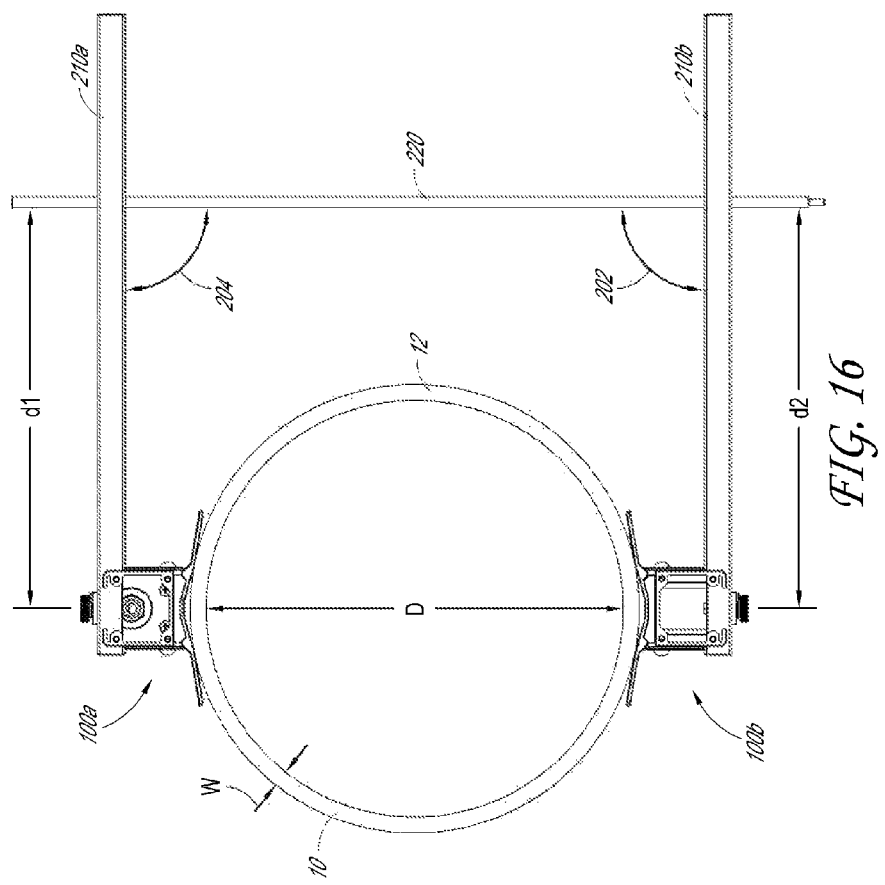
FIG. 16 is a front view of the transducer assembly configuration of FIG. 15.

The aperture 212 into which the orientation rod 220 is inserted can be located at a distance d1 from the center of the track 120 of the transducer assembly 100a, as illustrated in FIG. 16. The orientation rod 220 can be further passed through the aperture 212 in the alignment rod 210a such that the orientation rod 220 enters and passes through an aperture 212 in the alignment rod 210b installed on the transducer assembly 100b. The alignment rod 210b can be similar or substantially identical to the alignment rod 210a and can have an aperture 212 located at a distance d2 from the centerline of the track 120 of the transducer assembly 100b. To facilitate insertion of the orientation rod 220 through the apertures 212 in both alignment rods 210a, 210b, the distance d2 can be substantially the same as the distance d1.

Figure 15:
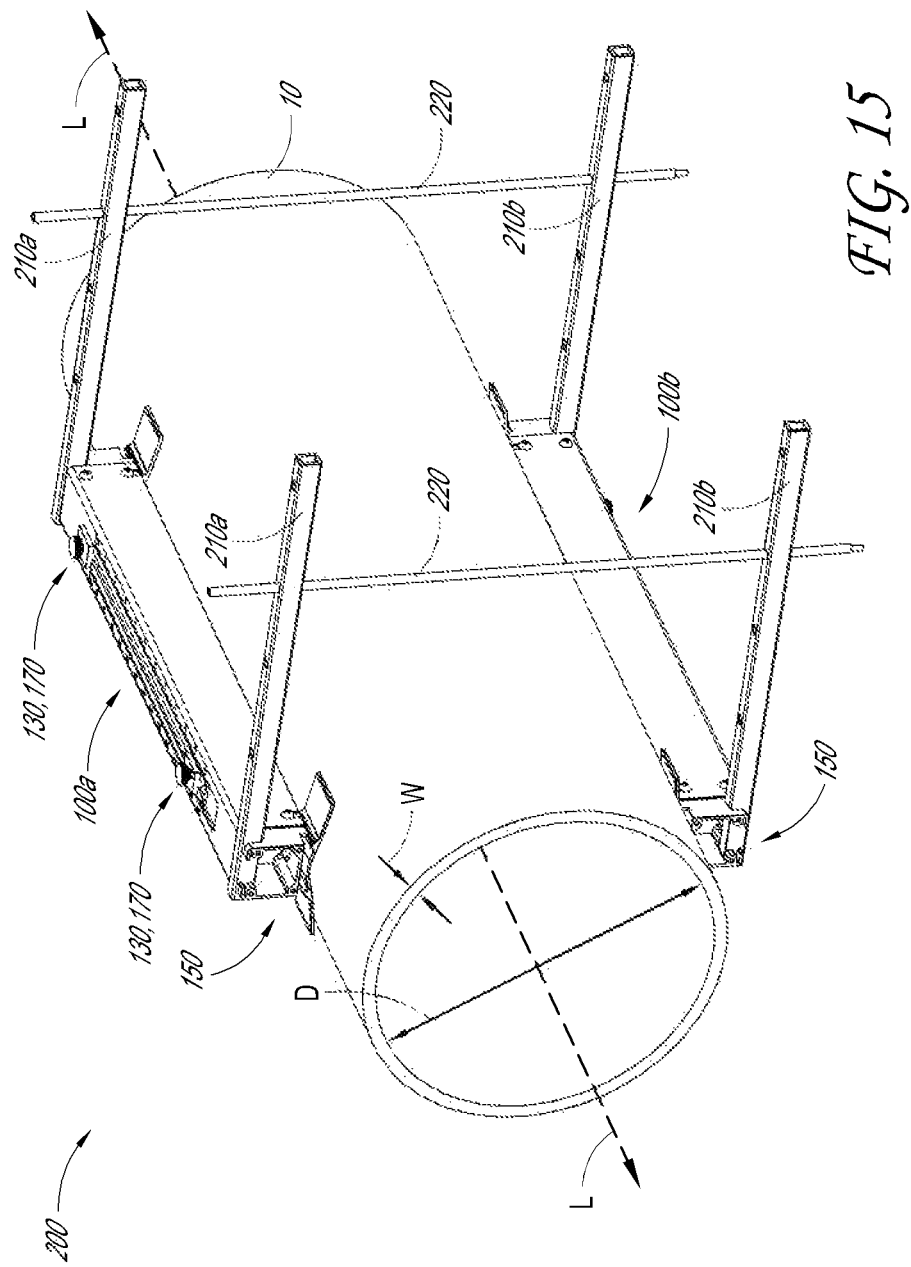
FIG. 15 is a perspective view of a transducer assembly configuration having two transducer assembly installation devices installed on the same pipe.

As illustrated in FIG. 15, upon insertion of the first orientation rod 220 through the apertures 212 in the alignment rods 210a, 210b, an additional orientation rod 220 can be passed through a pair of apertures 212 in the other pair of the alignment rods 210a, 210b in a manner similar to or substantially the same as that described above for the first orientation rod 220. The transducer assemblies 100a, 100b can then be moved along/onto the pipe 10 until the transducer assemblies 100a, 100b rest upon the wall 12 of the pipe 10 and the angles 202, 204 formed between the orientation rods 220 and the alignment rods 210a, 210b are substantially right angles. Upon alignment of the transducer assemblies 100a, 100b such that the angles 202, 204, 206 are substantially right angles while the transducer assemblies 100a, 100b rest upon circumferentially opposite sides of the pipe 10, proper alignment of the transducer assemblies 100a, 100b in both the longitudinal (e.g., parallel to the axial centerline L of the pipe 10) and circumferential directions can be assured. In some such cases, tightening devices can be passed through the strap channels 160 of the attachment structures 150 to hold the transducer assemblies 100a, 100b in place upon the pipe 10.

Figure 17:
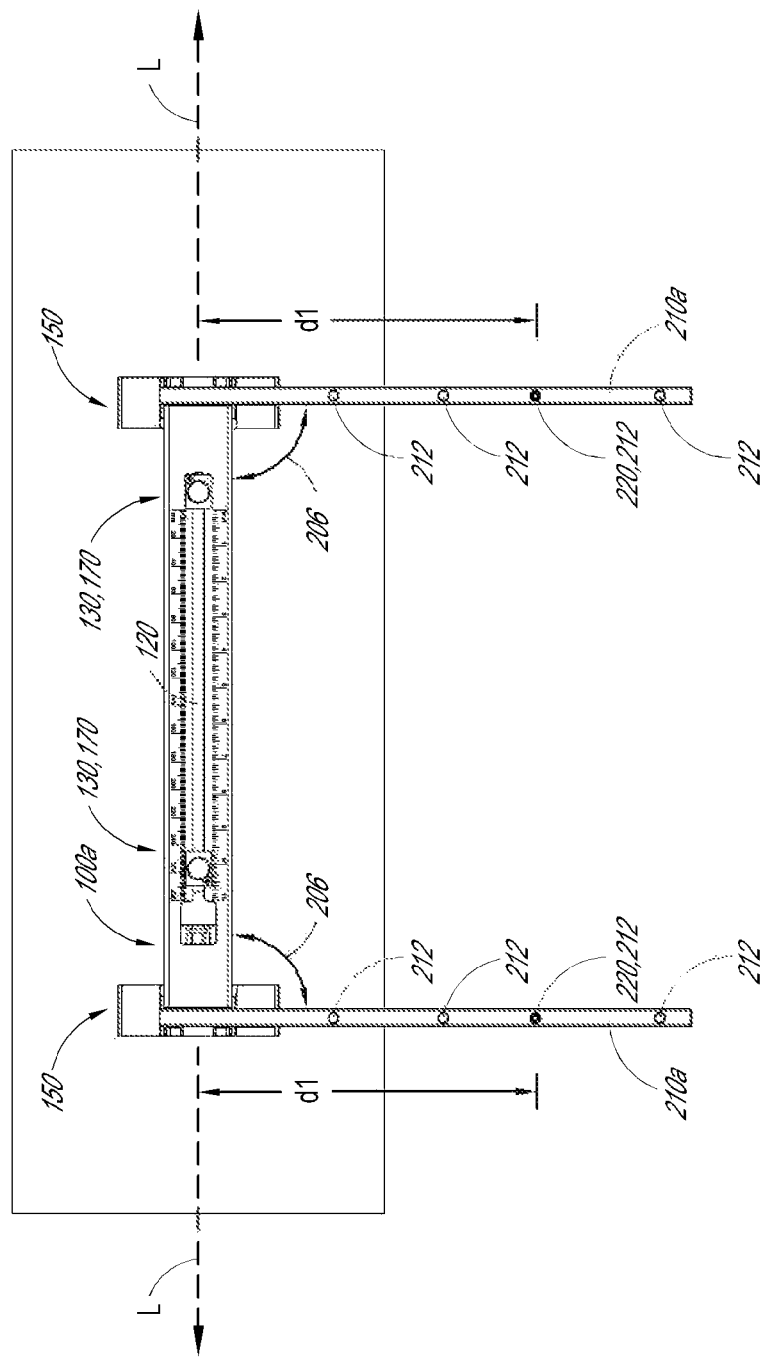
FIG. 17 is a top view of the transducer assembly configuration of FIG. 15.
Figure 18:
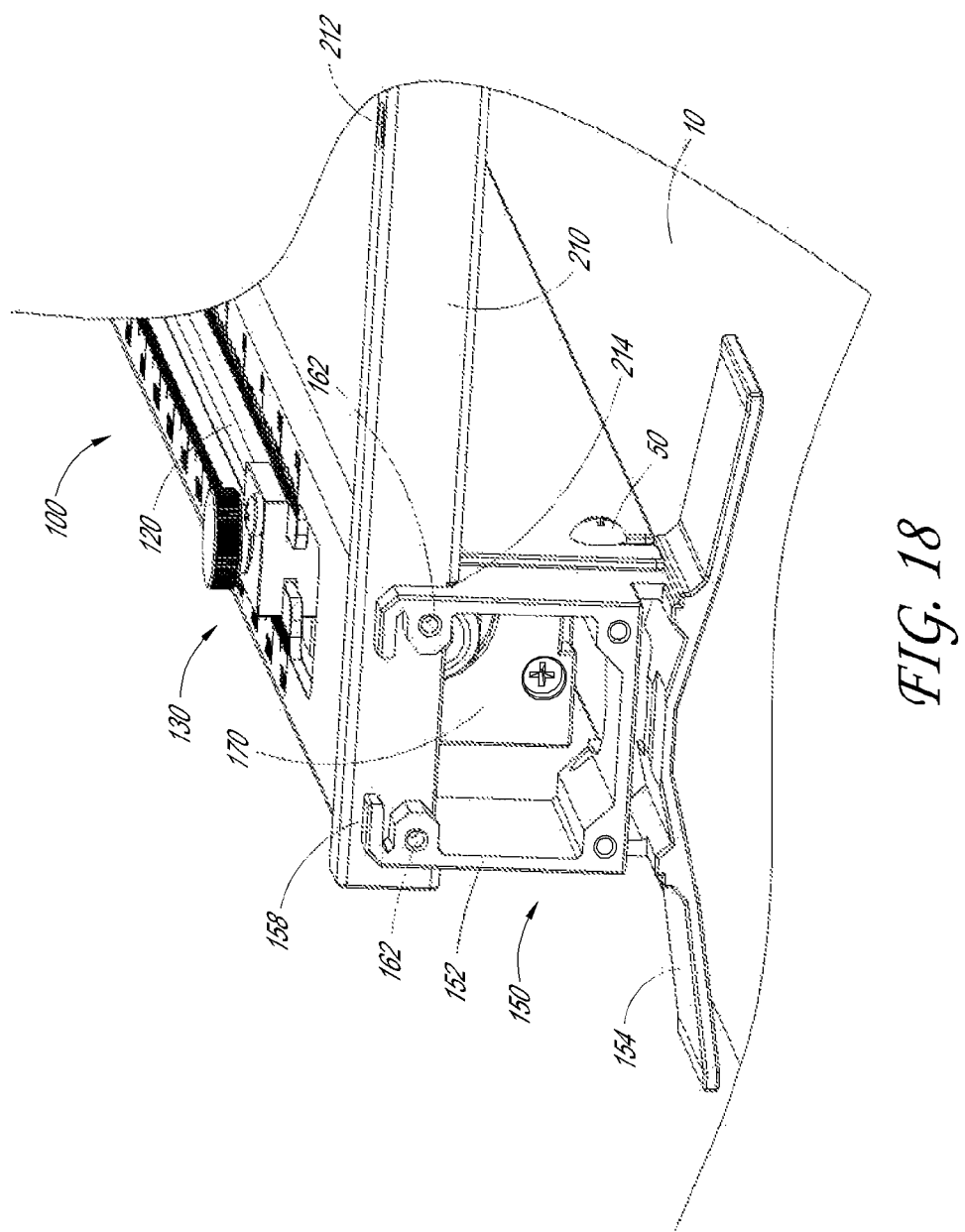
FIG. 18 is a zoomed-in view of an attachment structure connected with an expansion bar.
Figure 19:
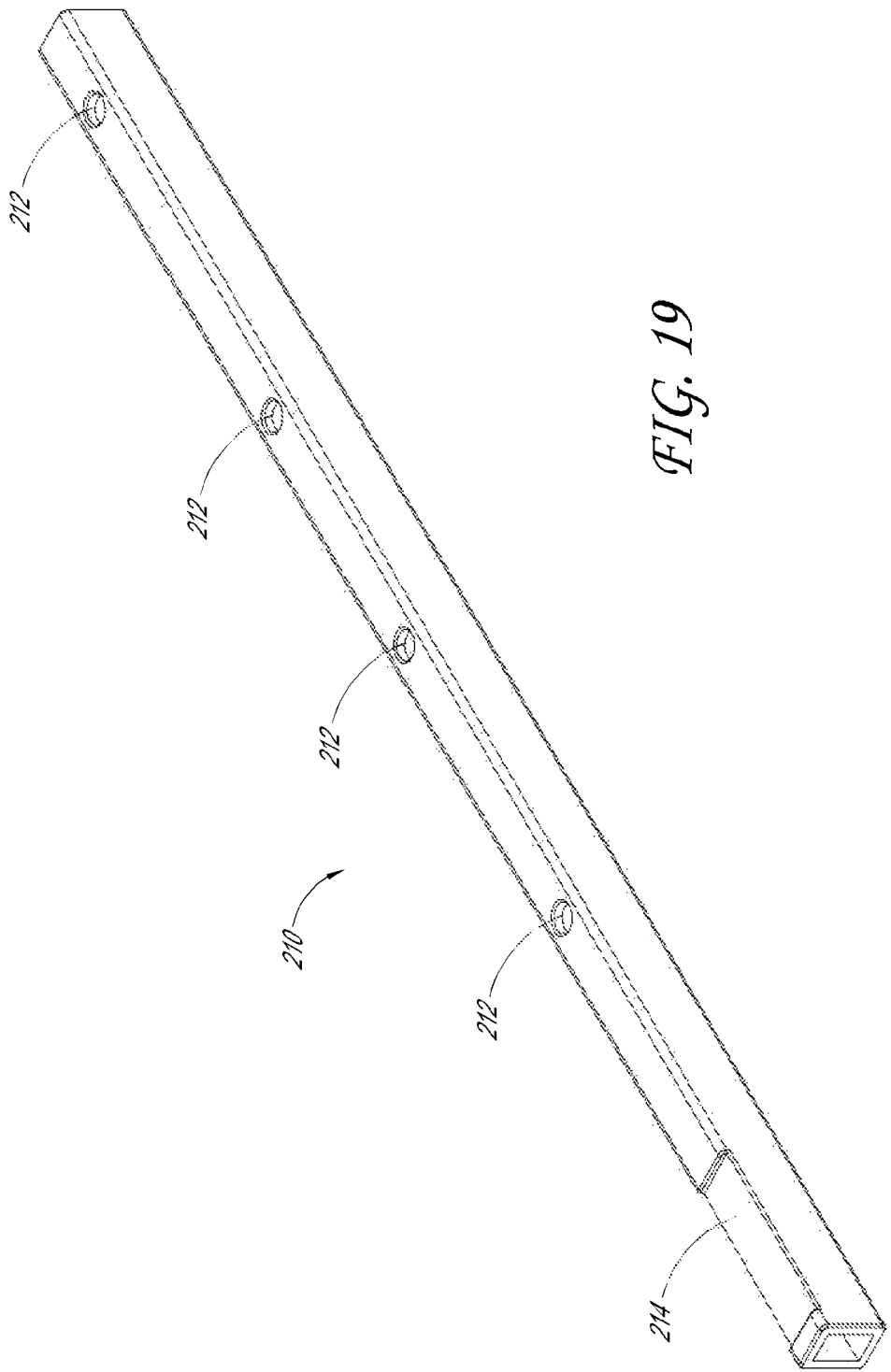
FIG. 19 is a perspective view of an embodiment of an expansion bar.

As illustrated in FIGS. 17 and 19, the alignment rods 210 can each include a plurality of apertures 212 located at varying distances from the centerline of the track 120 of the transducer assemblies 100a, 100b. Such a configuration could allow the alignment rods 210 to be used with a variety of pipe 10 have varying diameters D.

Figure 20:
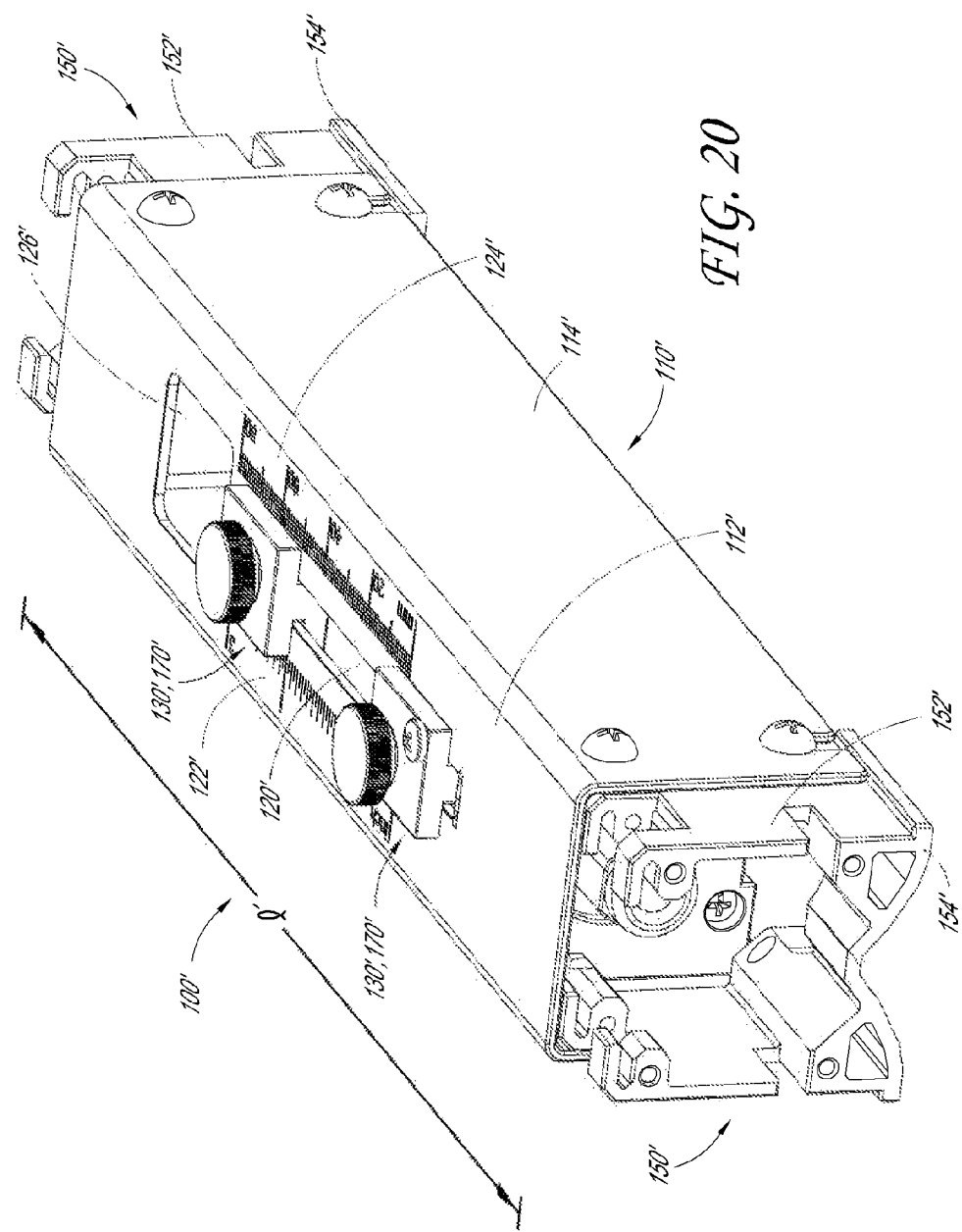
FIG. 20 is a perspective view of another embodiment of a transducer assembly installation device.

In some embodiments, transducer assemblies of varying lengths can be advantageous for used in certain scenarios. FIG. 20 illustrates another embodiment of a transducer assembly 100'. Numerical reference to components is the same as previously described, except that a prime symbol (') has been added to the reference. Where such references occur, it is to be understood that the components are the same or substantially similar to previously-described components. The transducer assembly 100' of FIG. 20 shows certain variations to the transducer assembly 100 discussed above with respect to FIGS. 5-10. It should be understood that the illustrated transducer assembly includes each of the features designated by the numbers used herein. However, as emphasized repeatedly herein, these features need not be present in all embodiments.

The transducer assembly 100' can have a transducer housing 110' that has a shorter length l' than the length l of the transducer housing 110 of the transducer assembly 100. The attachment structures 150' of the transducer assembly 100' can have alignment feature 154' with flanges that terminate closer to the body portion 152' than the flanges on the alignment features 154. The overall shape (e.g., the slope of the flanges) of the alignment feature 154' can vary from the overall shape of the alignment feature 154. For example, the slope of the flanges of the alignment feature 154' can be steeper than the slope of the flanges of the alignment feature 154. Such a steep slope can be used to align the transducer assembly 100' on a pipe 10 having a relatively small diameter D. In some embodiments, transducer assemblies 100' with relatively short lengths l' can be used for pipes 10 with small diameters D. In some such embodiments, material costs and/or storage costs relating to the transducer assemblies 100' can be reduced as the lengths l' of the transducer assemblies 100' are reduced.

Although the transducer assembly installation device and methods have been disclosed in the context of certain preferred embodiments and examples, it will be understood by those skilled in the art that the present disclosure extends beyond the specifically disclosed embodiments to other alternative embodiments and/or uses of the disclosed devices and methods and obvious modifications and equivalents thereof. In addition, while a number of variations of the devices and methods have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. Accordingly, it should be understood that various features and aspects of the disclosed embodiments can be combined with or substituted for one another in order to form varying modes of the disclosed devices and methods. Thus, it is intended that the scope of the present disclosure should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. An ultrasonic transducer assembly comprising:
   a transducer;
   a transducer housing having:
     a first end and a second end,
     a top wall,
     a first side wall connected to the top wall,
     a second side wall connected to the top wall, and
     a track in or on the top wall, the track extending along a portion of a length of the transducer housing between the first and the second end; and
   a positioning device capable of slidable engagement with the track, the positioning device having:
     a positioning body;
     a channel portion extending from the positioning body and capable of receiving at least a portion of the top wall adjacent the track;
     a track-clamping device capable of releasably fixing the positioning device to the top wall at a position along the length of the transducer housing, the track-clamping device having a user input portion; and
     a transducer-engaging device capable of adjustably connecting the positioning body to the transducer, the transducer-engaging device capable of adjusting a distance between the transducer and the track;
   wherein rotation of the track-clamping device in a first direction releasably fixes the positioning device to the top wall, wherein rotation of the track-clamping device in a second direction releasably unfixes the positioning device from the top wall, and wherein the transducer-engaging device is not supported by the track-clamping device.

2. The ultrasonic transducer assembly of claim 1, wherein the transducer-engaging device includes a user interface.

3. The ultrasonic transducer assembly of claim 1, wherein the transducer-engaging device is capable of rotating independent of the track-clamping device to adjust a distance between the transducer and the track.

4. The ultrasonic transducer assembly of claim 1, wherein the transducer-engaging device comprises a shaft portion, the shaft portion extending through the positioning body and into a cavity in the transducer, wherein the shaft portion engages with a nut within the cavity, the nut retained within the cavity and capable of rotation within the cavity.

5. The ultrasonic transducer assembly of claim 1, wherein the track comprises an entry portion sized and shaped to permit passage of the positioning body through the entry portion in a direction perpendicular to the top wall.

6. The ultrasonic transducer assembly of claim 1, further comprising a second transducer.

7. The ultrasonic transducer assembly of claim 6, further comprising a second positioning device connected to the second transducer, the second positioning device capable of slidable engagement with the track.

8. The ultrasonic transducer assembly of claim 1, wherein the transducer-engaging device comprises a threaded bolt having an axis of rotation.

9. The ultrasonic transducer assembly of claim 1, wherein the track-clamping device comprises a threaded bolt having an axis of rotation.

10. The ultrasonic transducer assembly of claim 9, wherein the axis of rotation of the track-clamping device is separate from an axis of rotation of the transducer-engaging device.

11. The ultrasonic transducer assembly of claim 1, wherein the track-clamping device releasably fixes and unfixes the positioning device to the top wall independent of the distance between the transducer and the track.

12. An ultrasonic transducer alignment assembly comprising:
   a first transducer assembly and a second transducer assembly, each of the first transducer assembly and the second transducer assembly including:
     a transducer;
     a housing and alignment assembly comprising
       a transducer housing having:
         a first end and a second end,
         a top wall, and a track in or on the top wall, the track extending along a portion of a length of the transducer housing between the first and the second end; and an alignment portion at a first position along a length of the transducer housing and configured to align the length of the transducer housing generally parallel to an axial centerline of a pipe when the alignment portion is positioned on the pipe; and a positioning device engaged with the transducer and configured to slidably engage with the track;

a first alignment rod having a length and a first alignment station and configured to releasably connect to the attachment structure of the first transducer assembly in an orientation generally parallel to the top wall of the first transducer assembly and generally perpendicular to the length of the transducer housing of the first transducer assembly, the first alignment rod extending away from transducer housing of the first transducer assembly in a first direction a distance greater than a radius of the pipe;

a second alignment rod having a length and a second alignment station and configured to releasably connect to the attachment structure of the second transducer assembly in an orientation generally parallel to the orientation of the first alignment rod when the second transducer assembly is positioned on a side of the pipe opposite the first transducer assembly, the second alignment rod extending away from transducer housing of the second transducer assembly in the first direction a distance greater than a radius of the pipe; and an orientation rod configured to mate with the first alignment station in the first alignment rod and with the second alignment station in the second alignment rod, the orientation rod configured to align perpendicular to the top walls of the first and second transducer assemblies when the second transducer assembly is positioned on a side of the pipe opposite the first transducer assembly and when the top wall of the first transducer assembly is positioned parallel to the top wall of the second transducer assembly.

13. The assembly of claim 12, wherein the alignment portion comprises a pair of flanges that extend away from the body portion.

14. The assembly of claim 13, wherein the flanges comprise a plurality of bends.

15. The assembly of claim 12, wherein the first and second alignment stations comprise alignment apertures.

16. The assembly of claim 15, wherein the orientation rod comprises an increased diameter portion capable of inhibiting the orientation rod from passing entirely through the first alignment aperture and through the second alignment aperture.

17. The assembly of claim 12, wherein each of the first and second transducer assemblies comprise a second attachment structure having a body portion and an alignment portion at a second position along a length of the transducer assembly and configured to align the length of the transducer housing generally parallel to an axial centerline of a pipe when the alignment portion is positioned on the pipe.

18. The assembly of claim 12, wherein at least one of the attachment structures comprises an alignment channel capable of receiving a portion of one of the first alignment rod and the second alignment rod.

19. The assembly of claim 18, wherein receipt of the portion of the first alignment rod or second alignment rod in the alignment channel aligns the first alignment rod or second alignment rod perpendicular to the length of the transducer housing.

20. The assembly of claim 18, wherein receipt of the portion of the first alignment rod or second alignment rod in the alignment channel aligns the first alignment rod or second alignment rod parallel to the top wall of the transducer housing.

21. An ultrasonic transducer alignment assembly comprising:

a first transducer assembly and a second transducer assembly, each of the first transducer assembly and the second transducer assembly including:
a transducer;
a housing and alignment assembly comprising
a transducer housing having:
a first end and a second end,
a top wall, and
a track in or on the top wall, the track extending along a portion of a length of the transducer housing between the first and the second end; and an alignment portion at a first position along a length of the transducer housing and configured to align the length of the transducer housing generally parallel to an axial centerline of a pipe when the alignment portion is positioned on the pipe; and a positioning device engaged with the transducer and configured to slidably engage with the track;

a first alignment rod having a length and a first alignment station and configured to releasably connect to the attachment structure of the first transducer assembly in an orientation generally parallel to the top wall of the first transducer assembly and generally perpendicular to the length of the transducer housing of the first transducer assembly, the first alignment rod extending away from transducer housing of the first transducer assembly in a first direction a distance greater than a radius of the pipe;

a second alignment rod having a length and a second alignment station and configured to releasably connect to the attachment structure of the second transducer assembly in an orientation generally parallel to the orientation of the first alignment rod when the second transducer assembly is positioned on a side of the pipe opposite the first transducer assembly, the second alignment rod extending away from transducer housing of the second transducer assembly in the first direction a distance greater than a radius of the pipe; and an orientation rod configured to mate with the first alignment station in the first alignment rod and with the second alignment station in the second alignment rod, the orientation rod configured to align perpendicular to the lengths of the first and second alignment rods when the second transducer assembly is positioned on a side of the pipe opposite the first transducer assembly and when the top wall of the first transducer assembly is positioned parallel to the top wall of the second transducer assembly.

* * * * *